United States Patent
Kane et al.

(10) Patent No.: US 8,277,612 B2
(45) Date of Patent: Oct. 2, 2012

(54) CONTROLLING THE DETECTABILITY OF AN ARTICLE AND METHOD FOR AUTHENTICATING THE ARTICLE

(75) Inventors: James Kane, Lawrenceville, NJ (US); William R. Rapoport, Bridgewater, NJ (US); Carsten Lau, Garbsen (DE)

(73) Assignee: Honeywell International Inc., Morristown, NJ (US)

( * ) Notice: Subject to any disclaimer, the term of this patent is extended or adjusted under 35 U.S.C. 154(b) by 13 days.

(21) Appl. No.: 12/970,401

(22) Filed: Dec. 16, 2010

(65) Prior Publication Data

US 2011/0146930 A1    Jun. 23, 2011

Related U.S. Application Data

(60) Provisional application No. 61/287,588, filed on Dec. 17, 2009.

(51) Int. Cl.
*D21H 11/00* (2006.01)
(52) U.S. Cl. .................................. 162/181.1
(58) Field of Classification Search ............ 162/181.1; 252/301.4 R, 301.4 S
See application file for complete search history.

(56) References Cited

U.S. PATENT DOCUMENTS

| | | | |
|---|---|---|---|
| 3,050,655 | A | 8/1962 | Goldberg et al. |
| 4,202,491 | A | 5/1980 | Suzuki |
| 4,387,112 | A | 6/1983 | Blach |
| 4,500,116 | A | 2/1985 | Ferro et al. |
| 5,569,317 | A | 10/1996 | Sarada et al. |
| 5,611,958 | A | 3/1997 | Takeuchi et al. |
| 6,264,107 | B1 | 7/2001 | Thomas, III et al. |
| 6,384,409 | B1 | 5/2002 | Libbey, III et al. |
| 6,436,313 | B1 | 8/2002 | Srivastava et al. |
| 2007/0023521 | A1 | 2/2007 | Wildey et al. |
| 2007/0295116 | A1 | 12/2007 | Le Mercier et al. |
| 2008/0185600 | A1 | 8/2008 | Thomas |

FOREIGN PATENT DOCUMENTS

| | | |
|---|---|---|
| GB | 2 258 659 A | 2/1993 |
| JP | 2002-212552 A | 7/2002 |
| WO | 2005/110943 A1 | 11/2005 |
| WO | 2007/003531 A1 | 1/2007 |

OTHER PUBLICATIONS

U.S. Appl. No. 11/632,436, filed Sep. 6, 2007, T.L. Mercier et al.

*Primary Examiner* — Mark Halpern
(74) *Attorney, Agent, or Firm* — Ingrassia Fisher & Lorenz, P.C.

(57) ABSTRACT

Cascading phosphors are described herein that produce emissions when they are excited by incident radiation. The cascading phosphors can be applied to articles, and can be useful in authenticating the article. The cascading phosphors include a host and at least three active ions.

16 Claims, 2 Drawing Sheets

CONTROLLING THE DETECTABILITY OF AN ARTICLE AND METHOD FOR AUTHENTICATING THE ARTICLE

RELATED APPLICATIONS

This application claims the benefit of U.S. Provisional Application Ser. No. 61/287,588, filed on Dec. 17, 2009, currently pending.

FIELD OF THE INVENTION

The present technology relates to methods for incorporating a luminescent feature into or onto articles for subsequent detection and authentication, and more particularly to luminescent features comprising cascading phosphors.

DESCRIPTION OF RELATED ART

In many applications, it is necessary to distinguish an original article and/or document from a copy or counterfeit. With modern copying techniques, for instance, printed material can be reproduced easily and can be virtually indistinguishable from the original. Various means and methods have been used for marking and identifying original items. For example, some methods involve visible (i.e. overt) features on or incorporated into a document, such as a hologram on a credit card, an embossed image or watermark on a bank note, a security foil, a security ribbon, colored threads or colored fibers within a bank note, or a floating and/or sinking image on a passport. While these features are easy to detect with the eye and may not require equipment for authentication, these overt features are easily identified by a would-be forger and/or counterfeiter. As such, in addition to overt features, hidden (i.e. covert) features may be incorporated into an article. Covert features include invisible fluorescent fibers, chemically sensitive stains, fluorescent pigments or dyes that are incorporated into the substrate of the value document. Covert features may also be included in the ink that is printed onto the substrate of an item or within the resin used to make films that are used to make laminated products. Since covert features are not detectable by the human eye, detectors configured to detect these covert features are needed to authenticate the article, which increases its security and helps Mitigate against forgery or falsification.

One method of using covert features involves marking documents with conventional luminescent pigments, such as those described in U.S. Pat. No. 5,611,958 (Takeuchi), wherein a latent mark is formed on an article using a doped rare earth orthophosphate phosphor that emits an infrared afterglow after being excited by infrared radiation of a different wavelength. Another example is U.S. Pat. No. 6,264,107 (Thomas) which describes a method for identifying an original document via measuring the duration and intensity of the afterglow produced by irradiating a rare-earth phosphor. Yet another example of using phosphorescence to securely mark an article can be found in U.S. Publication No. 2007/0023521 (Wildey). Since these authentication methods involve detecting a covert feature by evaluating its emission spectra, a disadvantage of this type of method is that a potential counterfeiter can reverse engineer the security feature merely by detecting the emission of the luminescent feature or determining its chemical composition.

Accordingly, there have been efforts to mask the covert feature or otherwise render the security feature more difficult to detect. For example, U.S. Pat. No. 5,569,317 (Sarada) discloses the use of an ink having not only fluorescent emissions, but also covert phosphorescent emissions. U.S. Patent No. 4,500,116 (Ferro) describes marking a credential, such as a passport or an identification card by impregnation or coating the credential with a phosphorescent composition which includes at least two phosphorescence activators which exhibit different emission characteristics both with respect to wavelength and lifetime. For example, when the article is illuminated, the afterglow color changes from green to blue. In U.S. Publication No. 2007/0295116 (Le Mercier Thierry), a process for authenticating articles is described that uses a phosphor to produce two different wavelength emissions, each having different decay times. Other examples of mixed phosphors for authentication purposes having different excitation and emissions wavelengths are disclosed in U.S. Pat. No. 4,387,112 (Blach). It is also known to "cascade" multiple phosphors, i.e. to use the light emitted by one phosphor to stimulate another phosphor or other material to emit light at a longer wavelength; e.g. see U.S. Pat. No. 3,050,655 (Goldberg) and U.S. Pat. No. 4,202,491 (Suzuki). Examples of security marking utilizing two phosphors in conjunction to produce a type of cascade emission is described in U.S. Pat. No. 6,384,409 (Libbey).

While pigments producing multiple luminescent emissions thwart inexperienced forgers and/or counterfeiters, those who are sophisticated and have the resources may be able to reproduce such covert features. This is particularly true for articles incorporating well known phosphors whose properties, such as excitation wavelength and emission wavelengths, are published. Even proprietary luminescent compositions are subject to detection and reverse engineering by counterfeiters. Therefore, there remains a need for difficult to detect phosphors useful for authenticating articles, particularly where such phosphors can be incorporated into the article itself instead of merely being a mark on the surface of the article. In addition, there is a need for such phosphors that also are suitable for marking paper and textile articles.

SUMMARY OF THE INVENTION

The present technology relates to cascading phosphors that produce at least one emission, and in some examples may produce a plurality of emissions, and that, when applied to an article, can be useful in authenticating the article.

In one aspect, a cascading phosphor is provided that includes a host material and at least three rare earth active ions substituted into the host material to form the cascading phosphor. When the cascading phosphor is irradiated with incident radiation, said first active ion transfers energy nonradiatively to said second active ion and said second active ion transfers energy nonradiatively to said third active ion, and at least one of the active ions produces a luminescent emission having a wavelength of at least about 1700 nm. In some examples, the host material can be selected from the group consisting of garnets, tungstates, oxides, oxysulfides, oxyfluorides, fluorides, vanadates, phosphates, niobates, tantalates, and combinations thereof. Additionally, in some examples, each of the at least three active ions can be selected from the group consisting of erbium, holmium, neodymium, praseodymium, thulium, and ytterbium.

In another aspect, a method for securely marking an article is provided that includes embedding a cascading phosphor as described herein onto or into the article. In certain preferred embodiments, the article is a paper or textile constructed, at least in part, of cellulose fibers.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1A:
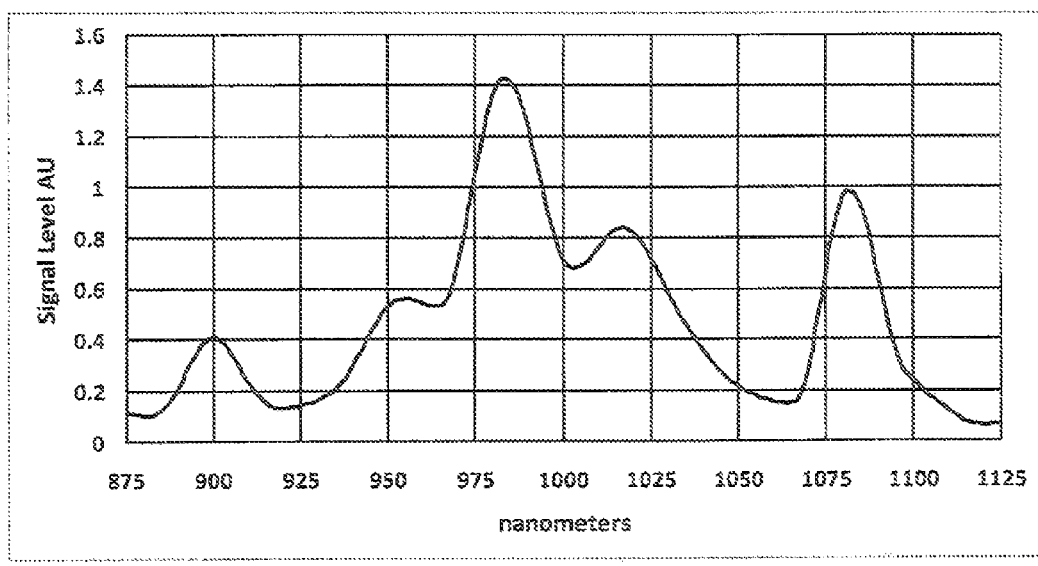
FIG. 1A shows one part of an emission spectrum of a cascading phosphor according to one example of the present technology.

Articles, such as value documents, may be designed with one or more covert authenticatable features incorporated onto or into the substrate of the value document in addition to the overt features that make it recognizable by the general public. Covert features include, but are not limited to, microprinting, multiple inks, UV absorbing visible emitting materials, upconverters, complex printing profiles, clear inks, infrared absorbing materials, magnetic inks, phosphors and varnishes. Over time, the use of covert features has become less secure since counterfeiters have become more sophisticated and have greater access to scientific equipment that can detect the incorporation of these features in value documents.

One possible method of improving the security of an article is to use authenticatable features, such as phosphors, that are hard to manufacture and/or are difficult to identify within the document. Another possible method is to increase the intelligence of a detector, so that rather than having the pass/fail parameter depend on simply detecting the presence of the authenticatable feature alone, the detector may be configured to, for instance, detect in pre-selected regions of emission spectra, or be dependent upon amounts of the authenticatable feature, or dependent upon interactions between authenticatable features. Further yet, by using materials that are difficult to make and/or that exhibit spectral and temporal characteristics that are very difficult to mimic, combined with a smart detector, the security of an article may be enhanced.

The present technology relates to a composition comprising a cascading phosphor that can produce at least one, and preferably a plurality of emission wavelengths and/or intensities after being subjected to incident excitation energy as further described herein, wherein the cascading phosphor is incorporated into or onto an article to allow for subsequent detection and either authentication or rejection of the article. As used herein, the term "cascading phosphor" means a phosphor having a single host material with at least two active ions wherein one or more energy transfers occur between the at least two active ions and, as a result of the energy transfer, at least one of the active ions emits luminescent radiation. In some examples, the cascading phosphors of the present technology include at least three active ions.

As used herein, the term "active ion" refers to an ion in a cascading phosphor that may absorb, transfer, and/or emit energy. Further, suitable cascading phosphors of the present technology comprise at least two, and preferably three active ions substituted in a single host material wherein the active ions and their relative concentrations are selected such that the combination of active ions produces emissions that may be used for authentication. A single cascading phosphor of the present technology may be used alone or in combination with other cascading or non-cascading phosphors.

Not to be bound by any particular theory, it is believed that this cascading effect results when a first active ion is selected in combination with a selected second active ion and optionally a selected third active ion such that the first active ion absorbs incident energy at an incident excitation wavelength relating to an absorption band of the first ion, optionally emits at least a portion of the absorbed energy at least a first emission wavelength, and transfers at least a portion of the absorbed energy to at least the second active ion. The second active ion optionally emits a portion of the transferred energy at least a second emission wavelength, and, in examples having a third active ion, further optionally transfers at least a portion of the transferred energy to the third active ion. The third active ion emits at least a portion of the transferred energy at least a third emission wavelength. The amount of the active ions and the host lattice material will determine the amount of energy transfer to the next active ion. In these cases, the first ion acts as the absorber and the final ion is always an emitter. It can be possible to engineer a substitution level to obtain emission from each ion, or to reduce or even quench the emission of one or two of the ions.

In some examples, a cascading phosphor may include a host material and at least three active ions substituted into the host material, wherein the first active ion absorbs excitation energy and transfers at least a portion of the energy to the second active ion and said second active ion transfers energy to said third active ion when the cascading phosphor is irradiated with incident radiation, and at least one of the active ions emits luminescent radiation. For example, the first active ion may absorb excitation energy and transfer at least a portion of the energy nonradiatively to the second active ion and the second active ion may transfer energy nonradiatively to said third active ion when the cascading phosphor is irradiated with incident radiation. In some such examples, the combination of active ions in the host material may produce a luminescent emission spectrum having X number of emission wavelengths, wherein X-1 wavelengths are derived from a cascading transfer of energy between active ions in the cascading phosphor. In one embodiment, for example, a cascading phosphor may comprise a host lattice material substituted with a first active ion, a second active ion, and a third active ion, wherein the type and relative concentration of the first, second, and third active ions is sufficient to produce three luminescent emissions. One of the luminescent emissions can be derived from irradiating the phosphor with incident radiation, and two of the luminescent emissions can be derived from a nonradiative transfer of energy between active ions. In one example, a cascading phosphor composition comprises three active ions wherein the first active ion is selected to transfer energy nonradiatively to at least the second active ion, the second active ion is selected to transfer energy nonradiatively to a third active ion, and the third active ion produces a detectable luminescent emission. Additionally, at least one of the first active ion and the second active ion may also produce a detectable luminescent emission. In at least one example, at least one of the active ions emits luminescent radiation having a wavelength of at least about 1700 nm. In some examples, a cascading phosphor according to the present technology may act, at least in part, as a downconverter. That is, the cascading phosphor will have at least one emission at a wavelength that is higher than the wavelength of the excitation energy. In some such examples, where the cascading phosphor acts as a downconverter, the wavelength of an emission of the second active ion is higher than the wavelength of an emission from the first active ion, and the wavelength of an emission of the third active ion is higher than the wavelength of an emission from the second active ion.

The present technology also relates to methods for authenticating articles by incorporating at least one cascading phosphor composition into or onto the article, detecting pre-determined parameters of the cascading phosphor, and authenticating or rejecting the article based on the pre-determined detection parameters. In a preferred embodiment, the cascading phosphor may be pre-selected to have at least one, preferably at least two, luminescent emissions in the infrared to provide for a complex spectral space. When selecting a cascading phosphor and corresponding detection parameters, the impact of, for instance, the composition and structure of the host material, processing temperatures, ion substituting levels, substituted impurities and the like should be considered since most emitter ions have a large number of spectral lines wherein the amplitude of the individual emission is a function of such. While a counterfeiter may be able to determine the covert ions in the authenticatable feature, the counterfeiter will not be able to determine which spectral lines of the emissions are used as pass/fail parameters in the detector/authentication apparatus.

In addition, when energy transfer occurs between two active ions, an emission may take place at a wavelength that does not correspond to the incident excitation wavelength, which allows for enhanced security of an article by increasing the difficulty of reverse engineering by spectral analysis. For instance, when ytterbium and neodymium in an gadolinium oxysulfide host are selected as active ions in a cascading phosphor composition, an ytterbium emission at about 1028 nm is detected by exciting into an absorption band or line related to neodymium at about 760 nm. As ytterbium alone does not show absorption at about 760 nm, this emission/excitation wavelength combination is only possible by energy transfer between the two active ions. In the case of partial energy transfers, the spectral signature of the cascading phosphor may be adjusted by, for instance, changing the substituting level of the active ions to be used in combination with sophisticated detection methods thereby increasing counterfeit resilience. More specifically, a detector may be configured to compare signal intensities derived from the first and second active ions within a single cascading phosphor. Detector sophistication may be enhanced by pre-selecting substituted active ion concentrations as a means of pre-selecting the relative emissions used by the detector for authentication. Detectors may also be used to resolve and distinguish signals based on the emission of one active ion when the emission has several lines that behave differently when concentrations of that active ion are changed.

Decay times of the cascading phosphor emissions may also be used alone or in combination with other pre-selected detection parameters for authentication. The decay time of the one or more infrared emissions of the cascading phosphors of the present technology may be modified to some degree by those skilled in the art to produce changes in temporal characteristics to make reverse engineering more difficult. For instance, decay times may be altered when the concentration of one of the pre-selected active ions is changed. In a preferred embodiment, a cascading phosphor of the present technology is pre-selected such that the transfer of energy between the active ions of the cascading phosphor results in altered decay time behavior, such that, for instance, the decay times for the emissions are different than the decay times would be for the individual active ions alone, which may be factored into the detection parameters.

Suitable active ions include combinations of at least two of the following active ions: erbium, holmium, neodymium, praseodymium, thulium, ytterbium. Preferably, the first active ion is pre-selected to be excited by ultraviolet (UV), visible, or IR radiation, with IR being preferred. After being excited by the radiation, preferred cascading phosphors produce at least one first, second, and/or third radiant emission in the infrared (IR) spectrum—i.e., at wavelengths between about 700 nm and about 3000 nm.

Suitable host materials, for example, can be selected from the group consisting of garnets, tungstates, oxides, oxysulfides, oxyfluorides, fluorides, vanadates, phosphates, niobates, tantalates, and combinations thereof. The relative concentration of each component is preferably high enough to facilitate the transfer of energy between activators, but not so high as to quench the desired emissions. In some examples, phosphors may be provided that comprise a host material and three or more active ions that are substituted into said host in amounts necessary to produce a cascading phosphor. Each of the three or more active ions may be selected from the group consisting of erbium, holmium, neodymium, praseodymium, thulium, and ytterbium. In some such examples, the host may be a rare earth oxysulfide, a rare earth oxyfluoride, or a garnet. Specific examples of cascading phosphors include, but are not limited to a yttrium oxysulfide substituted with neodymium, ytterbium, and holmium (YOS:Nd:Yb:Ho), and a yttrium gallium garnet substituted with erbium thulium and holmium (YGG:Er:Tm:Ho).

The amount and relative concentrations of the active ions in a cascading phosphor of the present technology may vary depending upon the particular host material and active ions that are selected. Preferably, the amount of the first ion is sufficient for the main absorption process. The selection of the host material and the type and amount of the first active ion can affect the selection of the type and amounts of the second and the optional third active ions. The amount of each active ion substituted into a host material is generally described in terms of atomic percent, where the number of ions of the host material that may be replaced by the active ions is equal to 100%. A corresponding host material ion of the cascading phosphor as mentioned herein is a cation that allows for replacement with rare earth active ions by similar size, similar coordination preference, and similar loading. A host material ion is not considered to be an active ion. In some examples, each active ion can be substituted into the host material in an amount that is from about 0.01 atomic percent to about 30 atomic percent, or from about 0.05 atomic percent to about 15 atomic percent. In some examples, known as stoichiometric phosphors, the inactive host material ions can be replaced up to 100 atomic percent with active ions. A non limiting example for this type of material is $NdP_5O_{14}$, which shows 100 atomic percent replacement of an inactive host material ion like e. g. lanthanum with the active neodymium ion.

The amount of cascading phosphor in the authenticable feature may vary over a wide range. For example, the amount, expressed as weight of cascading phosphor relative to the weight of substrate, may be from about 0.006% to about 40% by weight of the substrate, from about 0.01% to about 10% by weight of the substrate, or from about 0.5% to about 5% by weight of the substrate. It is different for paper and ink. Paper may contain a cascading phosphor in an amount from about 0.1% to about 0.5% by weight of the paper, while ink may contain a cascading phosphor in an amount from about 1% to about 30% by weight of the ink.

When selecting the cascading phosphor, absorption of the absorbing active ion and quantum yield of the overall luminescent phosphor may be considered when evaluating the efficiency of the composition, where luminescent quantum yield is defined as the ratio of the number of photons emitted to the number of photons absorbed by luminescence. The resulting cascading phosphors of the present technology preferably have an overall luminescent quantum yield of about 1% to about 30%, and more preferably from about 1% to about 85%. The efficiency of the composition may be used when defining the detection parameters for authentication of an article. In some embodiments, high efficiency of the cascading phosphor will be preferred, but in other embodiments, moderate to low efficiency will be preferred. In certain embodiments, weak emissions may be useful as detection parameters or used as a forensic feature, when checked with a spectrometer.

According to the present technology, the cascading phosphor may be applied to or incorporated within an article made of any material. Preferably, the article substrate is a solid material, such as paper, film, plastic sheet, board, glass, textiles, fibers, and the like which may be subsequently used to produce value documents such as bank notes, checks, stamps, identity papers, passport, credit or bank card as well as labels, seals, packaging and other elements for product security. In one example, the cascading phosphor may be added to the paper pulp or plastic base resin material. The base material may take the form of a safety thread, a mottling thread, a planchet, a laminated film, or a label. In still other embodiments, the cascading phosphor may also be incorporated in a liquid carrier such as a printing ink that may be affixed to an article as a predetermined image or pattern, for example by coating or printing an image onto the article.

The amount of cascading phosphor in the authenticable feature may vary over a wide range and is different depending on the application. The amount of cascading phosphor sufficient to produce a required detection level can be readily determined by those skilled in the art.

The present technology also relates to a method for determining the authenticity of an article, wherein the method comprising the steps of applying a cascading phosphor composition to an article or a component of the article, exposing the article to a source of incident energy at an incident excitation wavelength sufficient to produce a series of radiant emissions corresponding to a first, second, and third emission wavelengths; detecting pre-determined emission data, comparing the emission data with previously stored reference emission data, and deriving an authenticity indicator from the comparison results using a pre-selected decision criterion, and communicating the authenticity indicator thereby indicating authentication or lack of authentication of the test article.

The authentication method can be implemented using any type of suitable detector such that it involves at least one optical sensor arranged to detect, with spectral resolution, infrared radiation emitted from the cascading phosphor excited by a phosphor exciting light source to produce emission data. Suitable optical sensors include, for example, silicon, InGaAs, PbS, Ge and others that have the required spectral response, acceptable noise parameters, bandwidth and/or shunt impedance in the spectral detection regions as determined by one skilled in the art. These sensors produce signals that may be amplified by low noise electronics to a sufficient level such that they can be converted to digital values for processing. The output from the optical sensor depicts the emission data of the infrared radiation. The detector may further include means for measuring an emission signal, for example a spectrometer.

At least one processing unit, such as a computer, may be used to store reference data and collect, compare, and discriminate test data. For instance, the one or more processing units of the present technology operate under a predefined program wherein the processing unit collects the test emission data, compares the test emission data with previously stored reference emission data, and derives an authenticity indicator from the comparison results using a pre-selected decision criterion. The output unit, which may or may not be part of the processing unit, then communicates the authenticity indicator so as to indicate authentication or lack of authentication of the article.

EXAMPLES

The following examples are provided to illustrate certain aspects of the present technology. These examples are illustrative, and should not to be construed as being limiting in any way. The percentages in the examples below are atomic percentages for the amount of each of the three ions substituted into the host lattice material.

Example 1

Figure 1B:
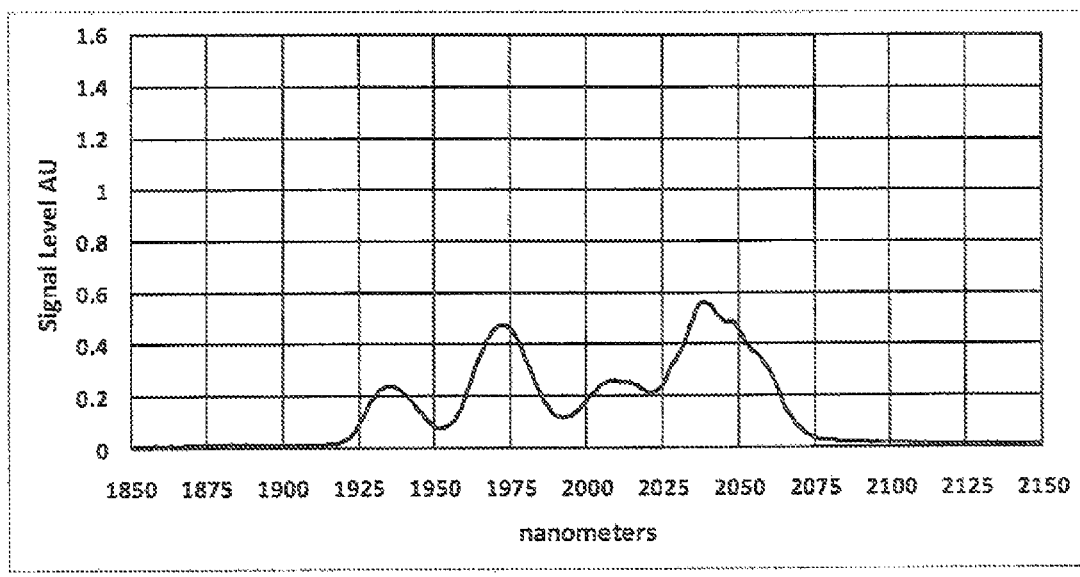
FIG. 1B shows another part of the emission spectrum of the cascading phosphor of FIG. 1A.

A yttrium oxysulfide cascading phosphor substituted with neodymium (0.7%), ytterbium (4%), and holmium (2.0%) to produce $YOS:Nd_{0.007}:Yb_{0.04}:Ho_{0.02}$ where the percentages are the amount substituted for yttrium in the host lattice material. The phosphor is excited at 760 nm corresponding to a Nd absorption in that spectral area. A graphical depiction of the emission spectrum is shown in FIG. 1A and FIG. 1B. In this example, as shown in FIG. 1A, the emission peaks at 900 and 1080 nm corresponds to Nd, and the remaining peaks centered at 980 nm correspond to Yb emission. The Nd transfers the energy over to Yb and emission can be observed for Yb. The Yb then transfers energy to Ho providing emission in the 1900-2100 nm range. Transfer from Nd to Ho is not present. In alternative examples, the emission can either be quenched or present for the Nd. FIG. 1B shows a wide band emission from 1900-2100 rim that corresponds to Ho emission for the emission spectrum of FIG. 1A. In this particular example, there is emission from all 3 rare earth active ions.

Example 2

A yttrium gallium garnet cascading phosphor substituted with erbium (10%), thulium (1%) and holmium (1%) of the formula YGG:Er:Tm:Ho. The phosphor is excited in the 600-700 nm range, which is the primary absorption range for Er. The energy transfers to Tm, which emits at 1700-1900 nm. The Tm then transfers energy to Ho, which emits in the 1850-2150 nm range.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A cascading phosphor comprising:
 a) a host material; and
 b) at least three rare earth active ions substituted into the host material to form the cascading phosphor;
 wherein, when the cascading phosphor is irradiated with incident radiation, said first active ion transfers energy to said second active ion and said second active ion transfers energy to said third active ion, and at least one of the active ions produces a luminescent emission having a wavelength of at least about 1700 nm.

2. The cascading phosphor of claim 1, wherein said host material is selected from the group consisting of garnets, tungstates, oxides, oxysulfides, oxyfluorides, fluorides, vanadates, phosphates, niobates, tantalates, and combinations thereof; and each of the at least three active ions is selected from the group consisting of erbium, holmium, neodymium, praseodymium, thulium, and ytterbium.

3. The cascading phosphor of claim 1, wherein said third active ion emits a luminescent emission derived from said transfer of energy between said second active ion and said third active ion.

4. The cascading phosphor of claim 1, wherein said luminescent emissions are in the infrared spectrum.

5. The cascading phosphor of claim 1, wherein first active ion absorbs energy having a wavelength in the ultraviolet, visible, or infrared spectrum.

6. The cascading phosphor of claim 5, wherein first active ion absorbs energy having a wavelength in the infrared spectrum.

7. The cascading phosphor of claim 5, wherein first active ion absorbs energy at about 760 nm.

8. The cascading phosphor of claim 1, wherein said host is an oxysulfide.

9. The cascading phosphor of claim 8, wherein said host is selected from the group consisting of yttrium oxysulfide, gadolinium oxysulfide, lanthanum oxysulfide, lutetium oxysulfide, and combinations thereof.

10. The cascading phosphor of claim 8, wherein said active ions are selected from the group consisting of holmium, neodymium, thulium, erbium, and ytterbium.

11. The cascading phosphor of claim 9, wherein said host is yttrium oxysulfide, said first active ion is neodymium, said second active ion is ytterbium, and said third active ion is selected from holmium, thulium, and combinations thereof.

12. The cascading phosphor of claim 11, wherein said third active ion is holmium.

13. The cascading phosphor of claim 11, wherein said third active ion is thulium.

14. A method for securely marking an article, the method comprising:
   applying a cascading phosphor of claim 1 to a surface of said article.

15. A method for securely marking an article, the method comprising:
   embedding a cascading phosphor of claim 1 into said article.

16. The method of claim 15 wherein said article is a paper or textile constructed of cellulose fibers and said cascading phosphor is embedded into said fibers.

\* \* \* \* \*